May 20, 1924.
J. R. CLARK
AIR BRAKE
Filed Oct. 11, 1923
1,494,734
2 Sheets-Sheet 2
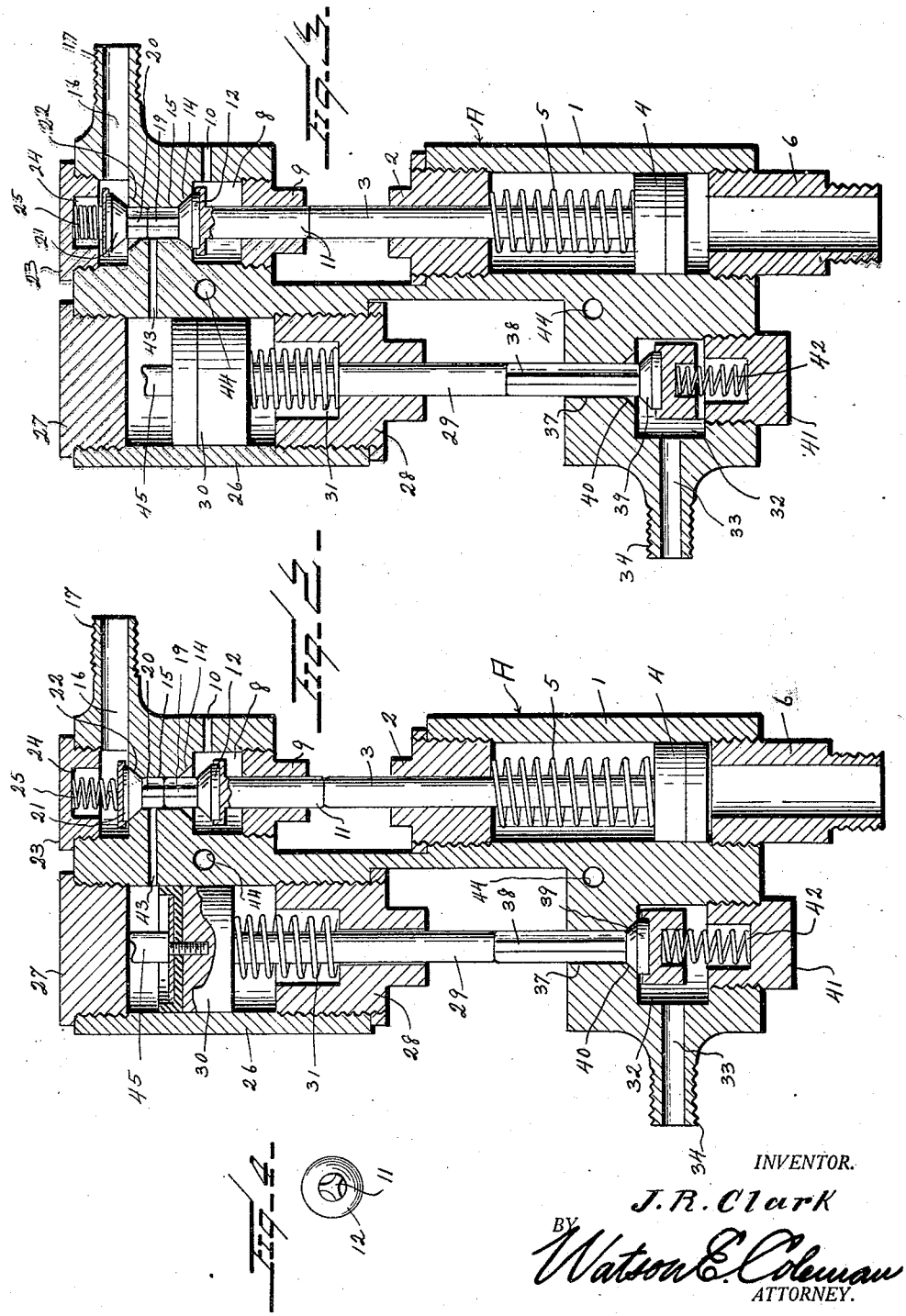
INVENTOR.
J. R. Clark
BY Watson E. Coleman
ATTORNEY.

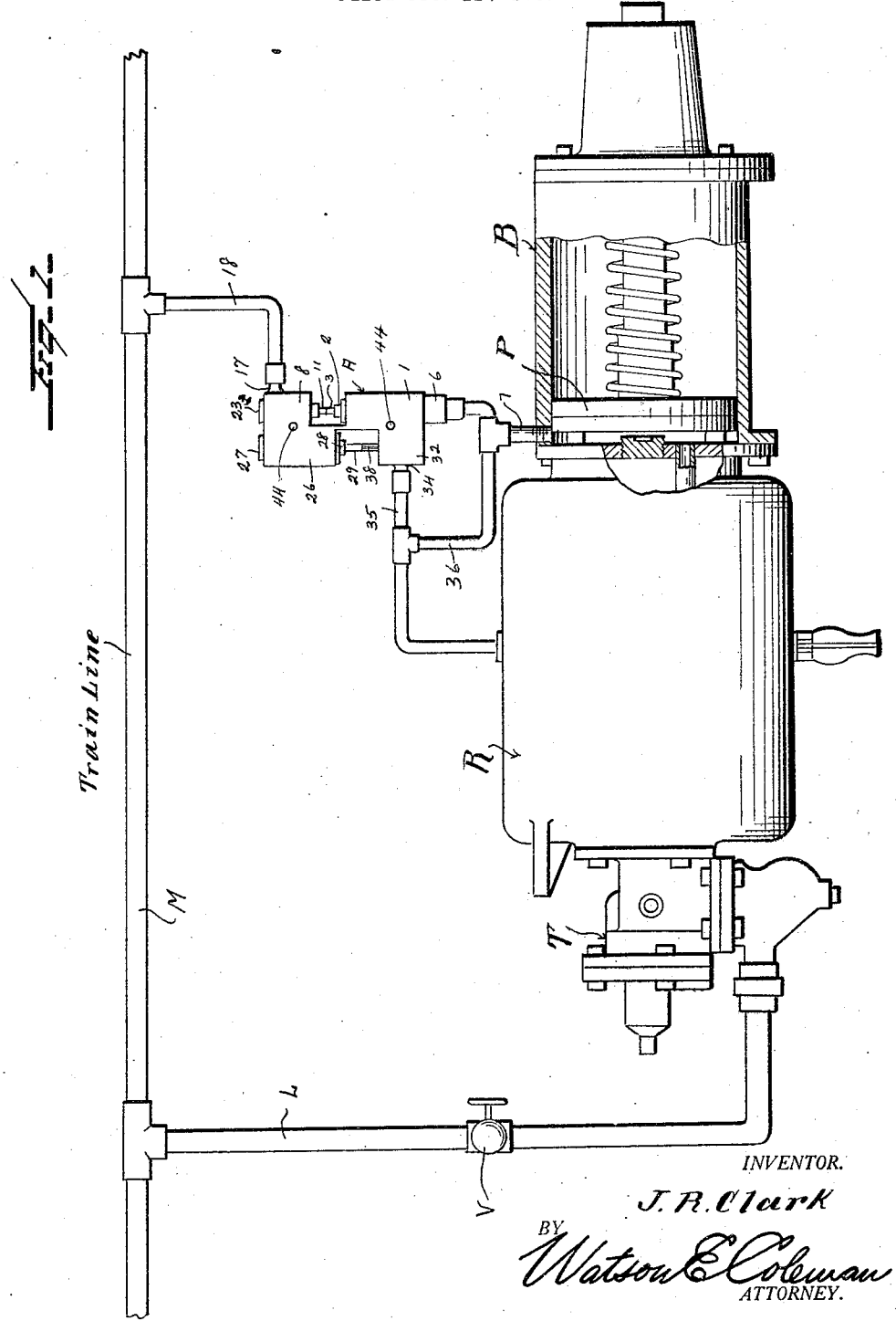

Patented May 20, 1924.

1,494,734

UNITED STATES PATENT OFFICE.

JOHN R. CLARK, OF CASPER, WYOMING.

AIR BRAKE.

Application filed October 11, 1923. Serial No. 667,995.

*To all whom it may concern:*

Be it known that I, JOHN R. CLARK, a citizen of the United States, residing at Casper, in the county of Natrona and State of Wyoming, have invented certain new and useful Improvements in Air Brakes, of which the following is a specification, reference being had to the accompanying drawings.

This invention relates to certain improvements in air brakes and it is an object of the invention to provide a novel and improved means operating to assure the movement of the brake into release in the event the triple valve should stick or otherwise fail to properly function.

It is also an object of the invention to provide a novel and improved means whereby the pressure within the brake cylinder or auxiliary reservoir or both may be reduced to facilitate the movement of the brake into release and which reduction is under control of the main or train line pressure.

An additional object of the invention is to provide a novel and improved device of this general character embodying a port in communication with the atmosphere and also adapted for communication with either the brake cylinder or auxiliary reservoir or both together with a normally closed valve for said port and together with means operable by a main or train line pressure to move said valve into open position.

The invention consists in the details of construction and in the combination and arrangement of the several parts of my improved air brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation and of a diagrammatic character illustrating an air brake constructed in accordance with an embodiment of my invention;

Figure 2 is an enlarged fragmentary view partly in section and partly in elevation taken through the automatic air reducing mechanism as herein employed with the movable parts in their normal positions;

Figure 3 is a view similar to Figure 2 but showing the movable parts in their second positions;

Figure 4 is an end elevational view of one of the valves and its stem as herein disclosed.

As disclosed in the accompanying drawings, B denotes a brake cylinder associated in a conventional manner with the auxiliary reservoir R and in connection with the reservoir is employed a triple valve T of any desired type.

M denotes the main or train line which is in proper communication with the triple valve through the branch line L. Interposed in the line L, as is well known, is a regulating or controlling valve V. Working in the brake cylinder B in the well known manner is the brake piston P.

A denotes a casting or body member of predetermined dimensions and configuration provided at one end portion with a cylinder 1 closed at one end portion by a plug 2 through which is slidably disposed the rod 3 for the piston 4 working in said cylinder 1. Interposed between the piston 4 and the applied plug 2 is an expansible member 5, herein disclosed as a coil spring, encircling the rod 3, said spring being of sufficient tension to normally maintain the piston 4 at the limit of its inward movement.

The opposite end portion of the cylinder 1 has engaged therein a nipple 6 with which is adapted to be coupled a line 7 in communication with the inner or rear portion of the brake cylinder B.

The casting or body member A at a point spaced from the outer end of the cylinder 1 is provided with a chamber 8 the outer end of which being closed by a plug 9, said chamber 8 having in communication therewith a port 10 leading to the atmosphere. Slidably disposed through the plug 9 is the stem 11 carried by the valve 12 adapted to coact with the internal valve seat 14. The valve 12 is normally open, such open position being maintained in a manner to be hereinafter referred to. The stem 11 of the valve 12 is of a length to terminate substantially in contact with the outer end of the rod 3 so that upon requisite outward movement of the rod 3 the valve 12 will be moved into closed position.

The chamber 8 has in communication therewith a port 15 which also communicates with an angularly related port 16, the outer end of said port being continued by a nipple 17. The nipple 17 has suitably coupled thereto a line 18 leading from the main or train line M.

The valve 12 has an extension 19 which partially extends within the port 15, the periphery of said extension 19 being provided with longitudinal flutes so that said extension 19 will not close the port 15 against flow of air therethrough. This extension 19 has its outer end terminating in substantially close contact with the outer end of an extension 20 carried by a valve 21 coacting with the valve seat 22 arranged at the junction between the port 15 and the port 16. This extension 20 also has its periphery provided with the longitudinally disposed flutes to permit requisite passage of air.

Engaged within the casting or body member A at a point opposed to the port 15 is a plug 23 having provided in its inner face and at the central portion thereof a recess 24 in which is seated an end portion of an expansible member 25 having its opposite end portion in contact with the valve 21. The expansible member 25 preferably, as herein disclosed comprises a coil spring of requisite tension. This spring 25 serves to normally maintain the valve 21 in closed position and also, by contact of the extensions 19 and 20 to normally maintain the valve 12 in open position. While the valves 8 and 21 operate in unison it is to be particularly noted that they are in reverse relation, to wit, when one of said valves is in open position the second is in closed position.

The casting or body member A to one side of the port 15 is provided with a second cylinder 26 having its opposite end portions closed by the plugs 27 and 28, the inner plug 28 having slidably disposed therethrough a stem 29 carried by a piston 30 working in the cylinder 26. Interposed between the plug 28 and the piston 30 is an expansible member 31 of requisite tension, said member being herein disclosed as comprising a coil spring, encircling the stem 29. This spring 31 is of a tension not to exceed the maximum air pressure within the main or train line M but preferably of a tension approximately the same as the pressure within the main or train line M. That is to say, if the brake is employed in connection with freight service the tension of such spring should be approximately seventy pounds, while when employed in connection with passenger service such tension should be approximately ninety pounds.

As is disclosed in the accompanying drawings, the plug 28 is threaded within the cylinder 26 and this provides means whereby, upon proper rotation of the plug 28 the tension of the spring 31 may be varied or regulated in accordance with the requirements of practice.

The casting or body member M to one side of the cylinder 1 and spaced from the cylinder 26 and substantially aligned with said cylinder 26 is provided with a chamber 32 having in communication therewith a port 33 continued by the nipple 34. The nipple 34 has suitably coupled thereto a line 35 leading to and in communication with the reservoir R. Leading from the line 35 and in communication with the rear portion of the brake cylinder B through the line 7 is the branch line 36.

Also in communication with the chamber 32 and leading to the atmosphere is a port 37 and slidably disposed through said port 37 is the stem 38 of the valve 39, said valve 39 coacting with the internal valve seat 40 arranged at the inner end of the port 37. The stem 38 has its periphery fluted lengthwise thereof so that when the valve 39 is in open position air may readily pass through the port 37 to the atmosphere.

Interposed between the valve 39 and the opposed wall of the chamber 32 or more particularly the applied plug 41 is an expansible member 42, herein disclosed as a coil spring, and which provides means whereby the valve 39 is normally maintained in closed position.

The spring 31 hereinbefore referred to serves to normally maintain the valve 30 at the limit of its inward movement, such position however being outwardly of the port 43 in communication with the piston 26 and with the port 15 at a point between the valve seats 14 and 22.

Normally the various valves are in the position illustrated in Figure 2 of the accompanying drawings.

When the air brake is set the pressure within the brake cylinder B behind the piston P passes through the nipple 6 and forces the piston 4 in a direction to cause the contacting stems 3 and 11 to seat the valve 12 and at the same time to open the valve 21 allowing air from the main or train line, when the same is applied, to pass through the port 43 to the cylinder 26 behind the piston 30. When such pressure within the cylinder 26 reaches a predetermined degree, which is governed by the tension of the spring 31, said pressure moves the piston 30 in a direction to cause the stem 29 to contact with the stem 38 opening the valve 39 and thereby permitting the air within the auxiliary reservoir R or in the brake cylinder B to escape to the atmosphere through the port 37. The tension of the spring 31 is so set that it will take slightly greater pressure to move the piston 30 than required to make the triple valve T, in case the same is functioning, to release the brake. However, if the triple valve T fails to function when the desired pressure is reached, the piston 30 will operate to effect the requisite bleeding of air from the auxiliary reservoir and brake cylinder.

When the triple valve is properly functioning and the air brake releases, the pressure will be drawn from in front or advance of the piston 4 through the nipple 6 whereupon the spring 25 will cause the valve 8 to move into open position and the valve 21 to move into closed position. It will also be understood that during this operation the receding of the piston 4 will be materially facilitated by the tension of the spring 5. When the valve 21 moves into closed position the valve 8 will also move into open position and at which time the port 10 is open and thereby permitting escape of the pressure within the cylinder 26 inwardly or rearwardly of the piston 30. By thus reducing such air pressure within the cylinder 26 the requisite functioning of the spring 31 to recede the piston 30 to its limit of inward movement is assured. As the piston 30 returns to its normal position the spring 42 will return the valve 39 to its closed position.

The casting or body member A may be positioned as desired and maintained in applied position in any manner preferred but, as herein disclosed, I provide such casting or body at points spaced longitudinally thereof with the openings 44 through which bolts or other suitable fastening means may be disposed. In practice, I find it of advantage to position the casting or body member A on a car sill at a point immediately adjacent to the brake cylinder.

While I have herein disclosed the line 35 in communication with both the auxiliary reservoir and the brake cylinder, it will be understood that such communication may be with only either of such parts.

With an air brake embodying my invention as herein disclosed it will be readily seen that proper release of the brakes is assured and thereby eliminating flat wheels, brake burnt wheels, worn out brake shoes, broken wheels or the like, as would otherwise be liable to occur in the event the brakes do not promptly respond to release position.

The inner or rear side of the piston 30 and at the axial center thereof is provided with an outstanding lug or head 45 which is adapted to contact with the inner head or plug 27 when the piston 30 is receded whereby positive means are provided for maintaining the piston 30 spaced from said inner head or plug 27 to assure the maintenance at all times of a chamber with which the port 43 communicates.

From the foregoing description it is thought to be obvious that an air brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed. It is to be understood that in claiming my invention reference to the communication with the brake cylinder is also meant to include similar communication with the auxiliary reservoir or both.

I claim:—

1. In an air brake, in combination with the train line and brake cylinder, a port in communication with the brake cylinder inwardly of the piston working in said cylinder and also in communication with the atmosphere, a valve normally closing the flow through said port, means operable by the pressure in the train line for moving said valve into open position, and means under control of the pressure within the brake cylinder for controlling the operation of the first named means.

2. In an air brake, in combination with the train line and brake cylinder, a port in communication with the brake cylinder inwardly of the piston working in said cylinder and also in communication with the atmosphere, a valve normally closing the flow through said port, means operable by the pressure in the train line for moving said valve into open position, means under control of the pressure within the brake cylinder for controlling the operation of the first named means, and means resisting the operation of the first named means until a predetermined pressure is imposed thereon.

3. In an air brake, in combination with the train line and brake cylinder, a port in communication with the brake cylinder inwardly of the piston working in said cylinder and also in communication with the atmosphere, a valve normally closing the flow through said port, means operable by the pressure in the train line for moving said valve into open position, means under control of the pressure within the brake cylinder for controlling the operation of the first named means, and means resisting the operation of the first named means until a predetermined pressure is imposed thereon, said last named means being regulable.

4. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, and means operable upon such movement of said last named piston to move the first named valve in open position to reduce the pressure within the brake cylinder inwardly of the piston working therein.

5. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, and automatic means for imparting reverse movements to the second and third named pistons and to the valves.

6. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, and means for bleeding the last named cylinder upon receding of the piston therein.

7. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, means for bleeding the last named cylinder upon receding of the piston therein, and a valve to close such bleeding when the first named valve is in open position.

8. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, means for bleeding the last named cylinder upon receding of the piston therein, and a valve to close such bleeding when the first named valve is in open position, both of said valves operating in unison but in reversed directions.

9. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, and means for limiting the inward movement of the last named piston to prevent the same passing beyond the port in communication with the cylinder in which said piston operates.

10. In an air brake, in combination with the train line and brake cylinder, a cylinder in communication with the brake cylinder inwardly of the piston working in the brake cylinder, a piston working in the second named cylinder, a port in communication with the atmosphere and with the brake cylinder inwardly of the piston working in said brake cylinder, a valve normally closing the flow through said port, a third cylinder, a piston working in said third cylinder, said third cylinder having a port in communication therewith inwardly of the piston working therein and also in communication with the main line, a valve normally closing the flow through the last named port, means operable by the piston in the second cylinder to move the last named valve into open position upon movement of said second named piston in one direction, the opening of said last named valve admitting main line pressure within the last named cylinder inwardly of the piston therein to move said piston in one direction, means operable upon such movement of said last named piston to move the first named valve in open position to reduce the pressure within the brake cylinder inwardly of the piston working therein, and means carried by the last named piston and coacting with a wall of its associated cylinder to limit the inward movement of said piston to prevent the same passing beyond the port in communication with such cylinder.

In testimony whereof I hereunto affix my signature.

JOHN R. CLARK.